(12) United States Patent
Goh

(10) Patent No.: US 11,958,701 B2
(45) Date of Patent: Apr. 16, 2024

(54) CRASH-RESISTANT BULK FLUID CARGO DISTRIBUTION TERMINAL

(71) Applicant: Lotus Technology PTE LTD, Singapore (SG)

(72) Inventor: Eng Soon Goh, Singapore (SG)

(*) Notice: Subject to any disclaimer, the term of this patent is extended or adjusted under 35 U.S.C. 154(b) by 523 days.

(21) Appl. No.: 17/274,442

(22) PCT Filed: Sep. 5, 2019

(86) PCT No.: PCT/SG2019/050445
§ 371 (c)(1),
(2) Date: Mar. 9, 2021

(87) PCT Pub. No.: WO2020/055324
PCT Pub. Date: Mar. 19, 2020

(65) Prior Publication Data
US 2021/0269261 A1  Sep. 2, 2021

(30) Foreign Application Priority Data

Sep. 10, 2018 (SG) .............................. 10201807799U

(51) Int. Cl.
*B65G 63/00* (2006.01)
*B65G 63/04* (2006.01)
(Continued)

(52) U.S. Cl.
CPC ......... *B65G 63/008* (2013.01); *B65G 63/047* (2013.01); *B65G 67/04* (2013.01);
(Continued)

(58) Field of Classification Search
CPC .... B65G 63/00; B65G 63/008; B65G 63/047; B65G 67/04; B65G 2207/40; E04H 5/00;
(Continued)

(56) References Cited

U.S. PATENT DOCUMENTS 3,986,708 A * 10/1976 Heltzel ................. G01G 19/34
414/502
5,501,200 A * 3/1996 Bogartz ................. F02B 43/00
123/527

(Continued)

FOREIGN PATENT DOCUMENTS

DE 102016000998 A1 8/2017
EP 1106568 A1 6/2001
EP 2671839 A1 12/2013

OTHER PUBLICATIONS

ISR; Austrian Patent Office; Vienna Austria; Nov. 13, 2019.

*Primary Examiner* — Nicolas A Arnett
(74) *Attorney, Agent, or Firm* — Patshegen IP; Moshe Pinchas

(57) ABSTRACT

The present invention describes a bulk fluid (wet or dry) cargo distribution terminal (10). The distribution terminal has a silo storage area (10A), a compartmentalized area (10B) which has designated inspecting, refilling and delivering/stacking stations (10C-10E). These storage and compartment areas are protected by fortified walls (11a-11e). Adjacent to the inspecting, refilling and delivering stations is a driveway (14). Trailers and prime movers carry IMO tanks and/or freight containers (22) for refilling or delivering. Located at entry and exit points of the driveway are guard-houses (72a,72b) to ensure safe operation at the distribution terminal. Overhead cranes (41a-41c) serve mechanical handling at the various stations and driveway.

16 Claims, 4 Drawing Sheets

(51) Int. Cl.
  *B65G 67/04* (2006.01)
  *E04H 5/02* (2006.01)
  *E04H 7/02* (2006.01)
  *E04H 7/22* (2006.01)
  *E04H 9/10* (2006.01)

(52) U.S. Cl.
  CPC .............. *E04H 5/02* (2013.01); *E04H 7/02* (2013.01); *E04H 7/22* (2013.01); *E04H 9/10* (2013.01); *B65G 2207/40* (2013.01)

(58) Field of Classification Search
  CPC .... E04H 5/02; E04H 7/00; E04H 7/02; E04H 7/22; E04H 9/00; E04H 9/10
  See application file for complete search history.

(56) References Cited

U.S. PATENT DOCUMENTS

| | | | | |
|---|---|---|---|---|
| 5,983,962 | A * | 11/1999 | Gerardot | B67D 7/0476 222/626 |
| 6,186,195 | B1 * | 2/2001 | Anstotz | B65G 67/04 141/168 |
| 7,252,309 | B2 * | 8/2007 | Eng Soon | B65D 90/587 105/310 |
| 7,513,280 | B2 * | 4/2009 | Brashears | B65D 88/28 141/94 |
| 7,571,577 | B2 * | 8/2009 | Nanayakkara | E04H 9/10 52/319 |
| 8,585,341 | B1 * | 11/2013 | Oren | B65D 90/587 414/407 |
| 10,618,744 | B2 * | 4/2020 | Eiden, III | B65D 88/32 |
| 11,174,102 | B2 * | 11/2021 | Alba | B65G 63/004 |
| 2007/0214951 | A1 * | 9/2007 | Swinson | F41H 5/0457 89/36.02 |
| 2011/0139811 | A1 * | 6/2011 | Mitropoulos | B67D 7/78 141/193 |
| 2016/0039433 | A1 * | 2/2016 | Oren | B65D 90/587 410/68 |
| 2018/0354732 | A1 * | 12/2018 | Garcia | B65G 67/04 |

* cited by examiner

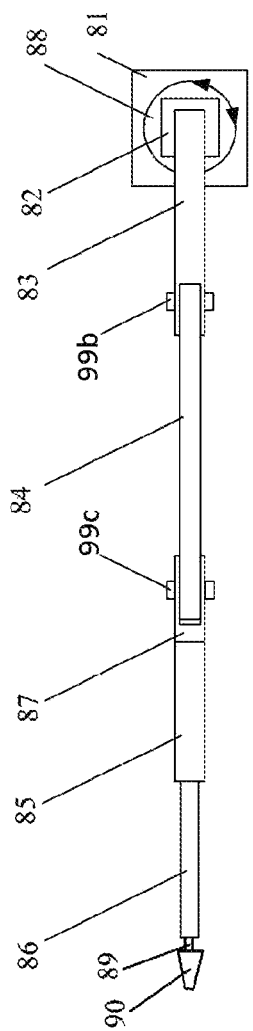
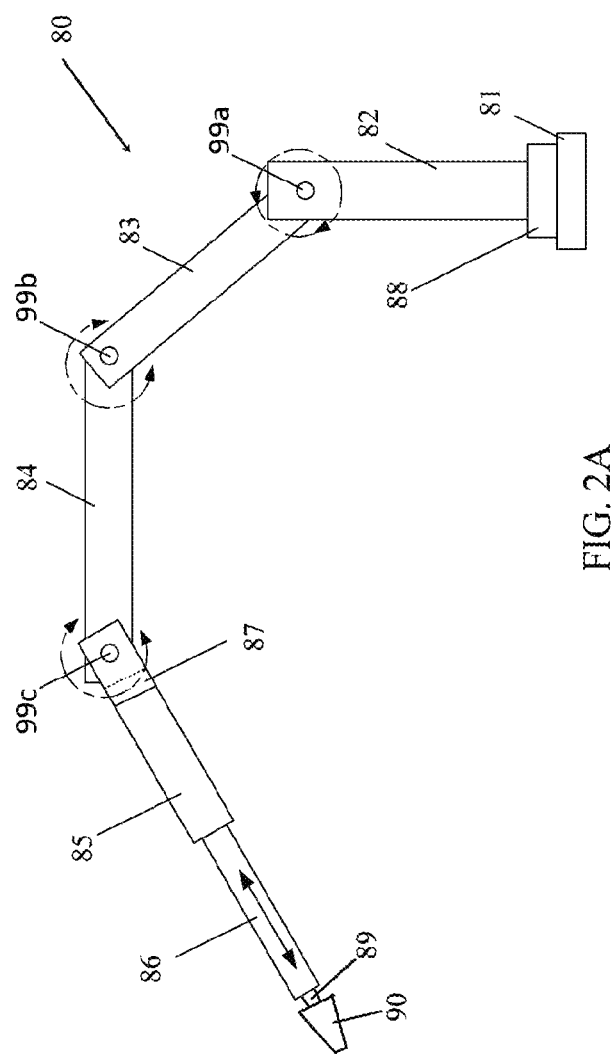
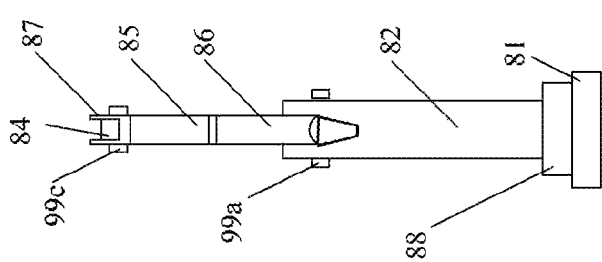

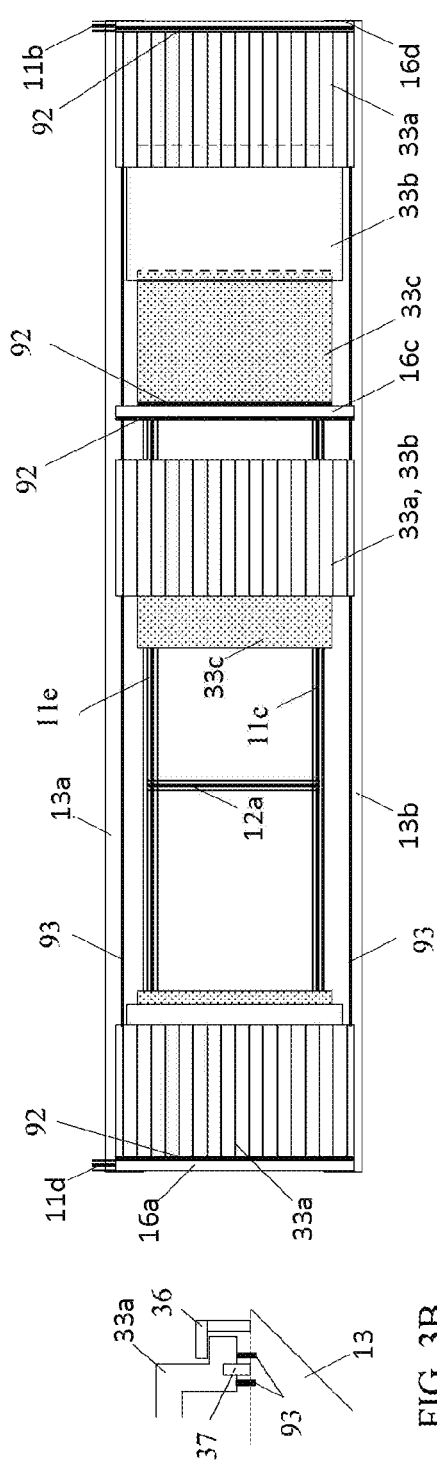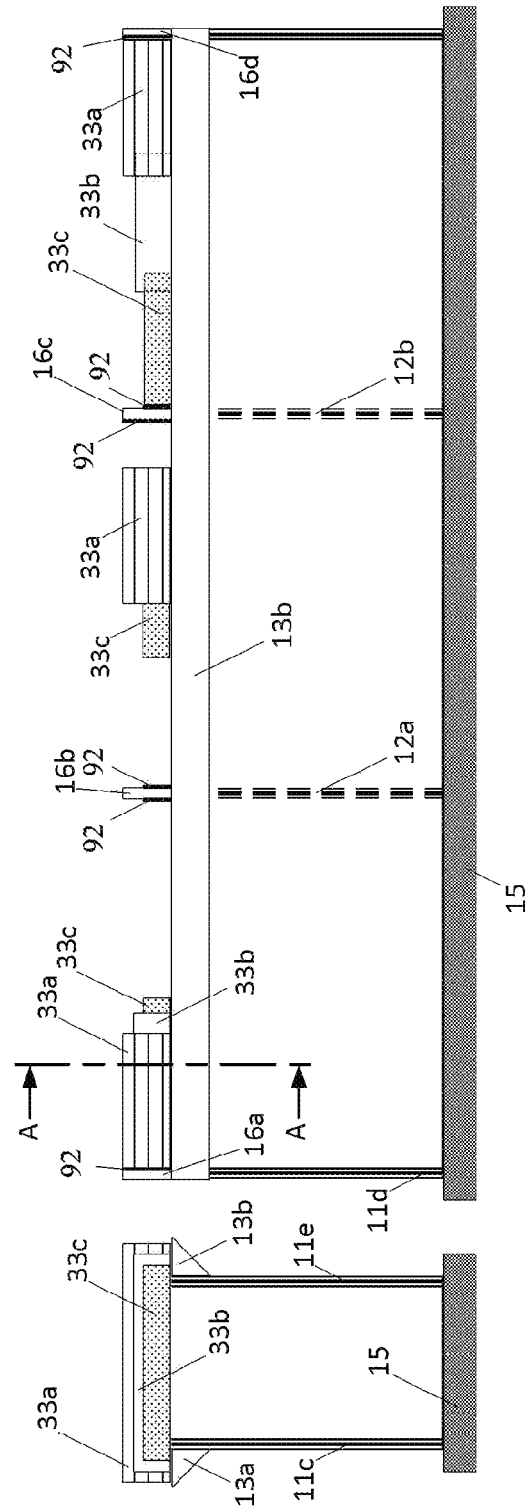

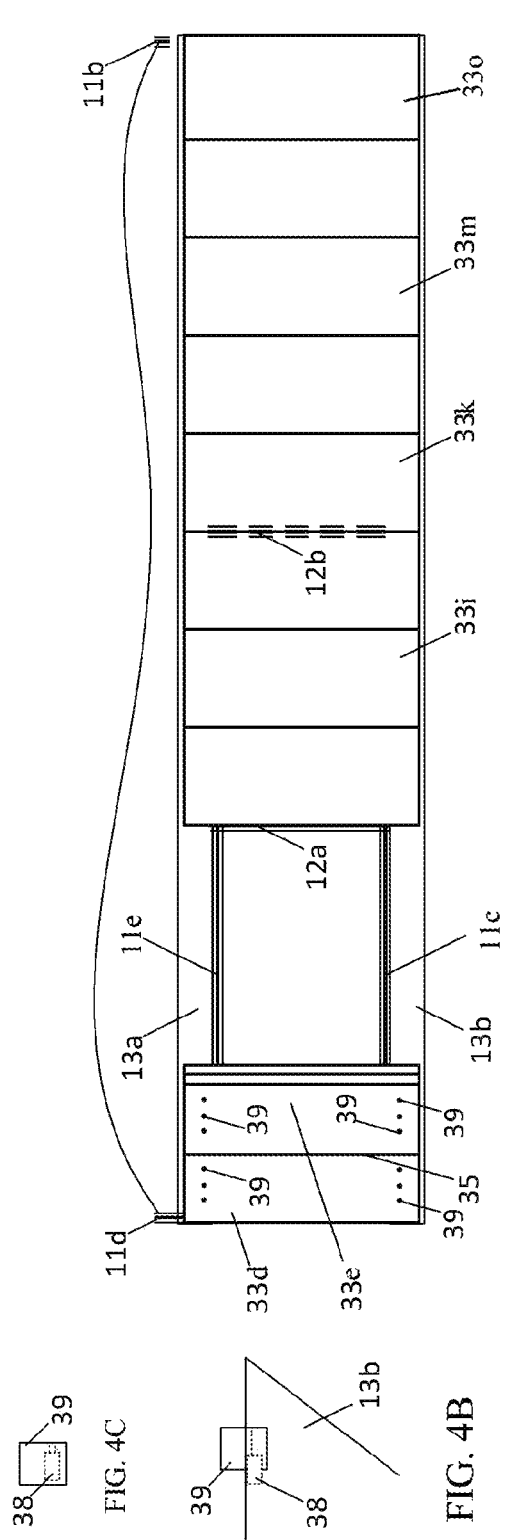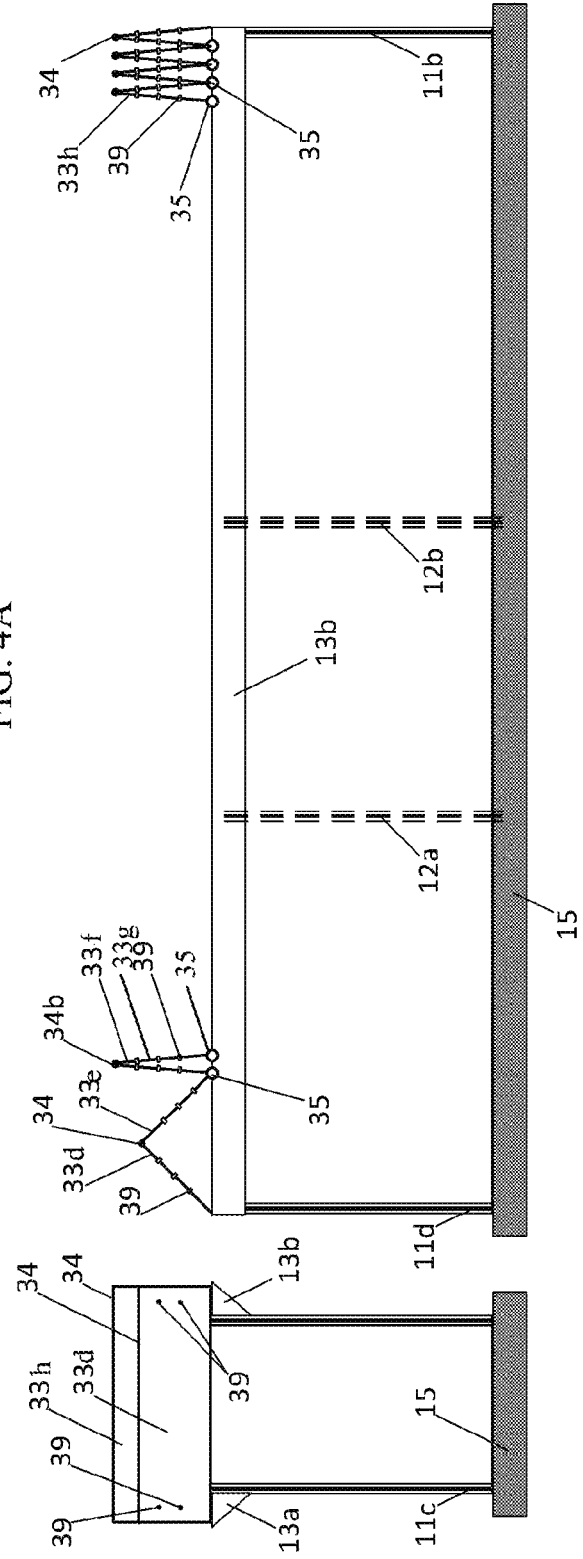

CRASH-RESISTANT BULK FLUID CARGO DISTRIBUTION TERMINAL

FIELD OF INVENTION

The present invention relates to a crash-resistant bulk fluid cargo distribution terminal. In particular, the invention relates to a distribution terminal for storing fuel oils, chemicals, fluids and gases, dry granular cargoes that are flowable, and so on, in silos, IMO tanks and ISO freight containers, a drive bay for prime-movers and trailers to bring in empty IMO tanks/freight containers and to deliver refilled IMO tanks/freight containers.

BACKGROUND

Many types of refueling stations have been built. For eg., China Utility Model CN205575620U discloses a skid-mounted fuel station where the operation room, oil tank and operation console are separated. In addition, the fuel station has some explosive-proof features.

In another approach, European patent 0507690B1 discloses a transportable fuel filling station. The station is made up of a prefabricated building, which can be dismantled and moved to another site; in addition, the floor is made up of metal sections.

U.S. Pat. No. 8,176,931 discloses a mobile fuel distribution station. An operation platform is elevated to a height by legs, whilst a central platform connects the bases of at least two of the legs. Fuel stored in a fuel tank located in the operation platform is delivered down the legs to a dispenser.

It can be seen that none of the above disclosures relate to a crash-resistant bulk fluid cargo distribution terminal; thus, there exists a need to provide a bulk fluid cargo (wet and dry) distribution terminal fortified against acts of terrorism and at the same time to allow refilling, storing and delivering of refilled IMO tanks and/or freight containers.

SUMMARY

The following presents a simplified summary to provide a basic understanding of the present invention. This summary is not an extensive overview of the invention, and is not intended to identify key features of the invention. Rather, it is to present some of the inventive concepts of this invention in a generalised form as a prelude to the detailed description that is to follow.

The present invention seeks to provide a crash-resistant bulk fluid cargo distribution terminal for wet cargo (such as, fuel oils, chemicals, fluids and gases) and dry cargo (such as granular cargoes that are flowable), and so on. The distribution terminal is fortified against a vehicle crash or explosive forces, and security systems are put in place to address acts of terrorism or vandalism, such as, via the IMO tanks or freight containers.

In one embodiment, the present invention discloses a bulk fluid cargo distribution terminal comprising: a silo area for storing wet cargo including fuel oils (including diesel, petrol and kerosene), liquid chemicals, fluid chemicals (including cryogenic gases and industrial gases) or dry cargo (including granular material), which wet and dry cargoes are fluid or flowable and are suitable for distribution in IMO tanks or freight containers; a compartmentalized area separated along a side of the silo area, with the compartmentalized area being designated as an inspecting station, a refilling station and a delivering/stacking station; and a driveway located adjacent to the compartmentalized area, with the driveway having an entry point and an exit point for prime-movers and trailers carrying IMO tanks or freight containers; wherein the silo area and the compartmentalized area are protected by walls that are fortified against a vehicle crash or blast forces.

Preferably, a crane is arranged to traverse above a top of the fortified walls to serve the inspecting, refilling and delivering/stacking stations, with the crane extending over the driveway. A guard or security control room is located near each of the entry and exit points to ensure safety and operation of the distribution terminal.

Preferably, the refilling station comprises an articulated refilling arm with a pedestal, which pedestal has a rotary joint. The pedestal and rotary joint are supported on a carrier. The carrier is operable to translate or moveable on a track, is fixedly mounted to the ground or suspended above the IMO tank or freight carrier. Preferably, the articulated refilling arm terminates with a refilling nozzle and accompanying position and flow sensors. Preferably, the refilling nozzle is mounted on a connector connected to a telescopic segment, which telescopic segment is associated with an extreme member of the articulated arms and the telescopic segment is extendable, retractable and rotatable, which positions are determined by position sensors. The articulated arms are pivoted and associated position sensors also determine positions and orientations of the articulated arms.

Preferably, the articulated members of the refilling arm further comprise a discharge hose that goes through an inside hollow cavity of the articulated arms. Alternatively, a transfer hose with an associated discharge nozzle is attached to an outside of the telescopic segment and, at least, to part of the extreme articulated arm. When refilling a freight container, a transfer chute with an associated discharge chute is attached to an outside of the telescopic segment and, at least, to part of the extreme articulated arm to direct the dry cargo into an inlet hopper. Preferably, a pedestal supports two or more refilling arms and the two or more refilling arms can be deployed simultaneously without mechanical interference.

BRIEF DESCRIPTION OF THE DRAWINGS

This invention will be described by way of non-limiting embodiments of the present invention, with reference to the accompanying drawings, in which:

FIGS. 2A-2C illustrate a refilling arm for use in the bulk fluid cargo distribution terminal shown in FIG. 1;

FIGS. 3A-3D illustrate a nested roof cover arranged over the inspecting, refilling and delivering stations, which form part of the terminal shown in FIG. 1; and FIGS. 4A-4E illustrate a folding and retractable roof cover arranged over the inspecting, refilling and delivering stations, which form part of the terminal shown in FIG. 1.

DETAILED DESCRIPTION

Figure 1:
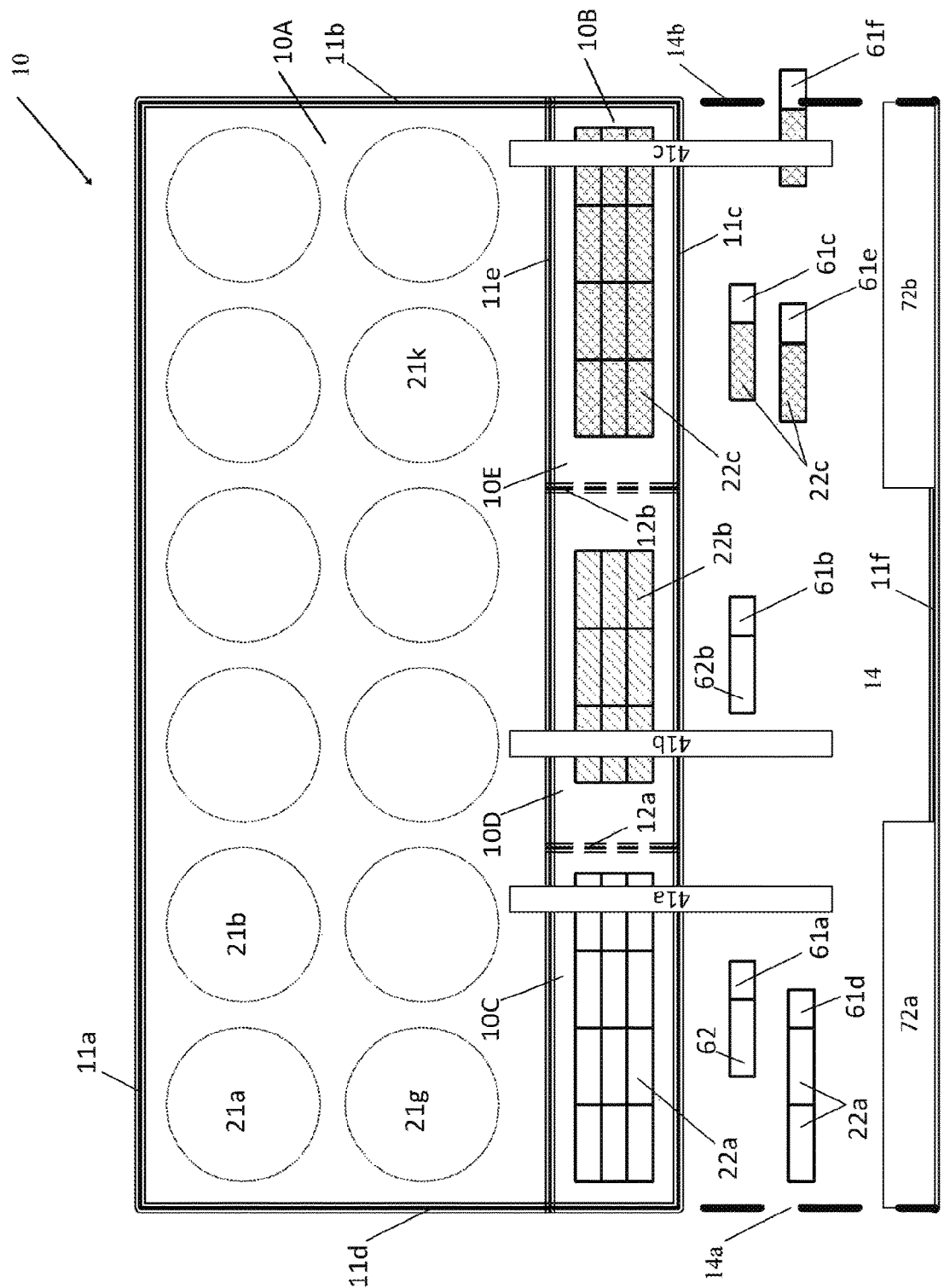
FIG. 1 illustrates a layout of a crash-resistant bulk fluid cargo distribution terminal according to an embodiment of the present invention.

One or more specific and alternative embodiments of the present invention will now be described with reference to the attached drawings. It shall be apparent to one skilled in the art, however, that this invention may be practised without such specific details. Some of the details may not be described at length so as not to obscure the invention. For ease of reference, common reference numerals or series of numerals will be used throughout the figures when referring to the same or similar features common to the figures.

FIG. 1 shows a crash-resistant bulk fluid cargo distribution terminal 10 according to one embodiment of the present invention. The bulk fluid cargo may be wet cargo (such as fuel oils (including diesel, kerosene, petrol, and so on), liquid chemicals and fluid chemicals (including cryogenic gases, industrial gases, and so on) and dry cargo (such as, grains or granular material) that is flowable and that are commonly stored and delivered in containerized units which fit regular shipping freight containers specifications; these shipping containers include those that embody ISO freight container specification and IMO tank specification; these freight containers and IMO tanks use corner castings for mechanical handling.

As seen in FIG. 1, the distribution terminal 10 includes two areas 10A, 10B that are protected by fortified walls 11a-11d, for eg., against vehicle crashes or explosive blast forces. In storage area 10A, silos 21, 21a, 21b, etc. are used to store the bulk fluid cargoes. Area 10B is divided along one side of the storage area 10A by a fortified wall 11e; preferably, area 10B is compartmentalized by fortified walls 12a, 12b into an inspecting station 10C, a refilling station 10D and a delivering cum stacking station 10E. These fortified walls have doors or shuttle openings (not shown in the figures) to allow movements of men, machines and materials. Along the outside of the inspecting stations 10C, refilling station 10D and delivering/stacking station 10E, is a drive way 14. The drive way 14 has an entry point 14a and an exit point 14b. Adjacent to the entry point 14a and exit point 14b are two respective guard houses 72a, 72b. The entry and exit points define a security restriction area along the drive way where prime-movers 61a-61f and associated trailers 62 carrying IMO tanks/freight containers 22 enter and exit. As can also be seen in FIG. 1, three gantry cranes 41a-41C are erected to run above the fortified walls to serve the inspecting, refilling and delivering/stacking stations. The gantry cranes may run on rails, with one rail being laid in the storage area 10A along the fortified wall 11e, whilst the other rail is along the driveway 14. With this arrangement, the gantry cranes 41a-41c span above the inspecting, refilling and delivering stations and extend across the drive way 14, so that empty IMO tanks/freight containers 22 can be transferred from the trailers 62 into the inspecting or refilling stations 10C, 10D or filled IMO tanks/freight containers can be transferred from the delivering station 10E onto designated trailers 62 and prime movers 61. The gantry cranes 41a-41c are equipped with spreaders that have twistlocks to fit with corner castings located on the frames of the IMO tanks and freight containers 22 for mechanical handling. Whilst three gantry cranes are described, it is possible that there are fewer or more cranes depending on the load capacity of the distribution terminal.

To support the fortified walls 11a-11e, 12a-12b to protect the bulk fluid cargo distribution terminal, the base or foundation must also have sufficient strengths to withstand some designed vehicle crash forces or anticipated explosive forces. In FIG. 3C-3D or 4C-4D, the foundation 15 is shown to be embedded to a depth below the ground level. Preferably, a wall 11f forming a side of the guard houses 72a, 72b is also fortified to withstand vehicle crashes or explosive forces. Preferably, a terminal operation or command room (not shown) is also located in or adjacent to the guard houses 72a,72b. Each compartmentalized area 10C, 10D, 10E may also have individual sub-operation room or a common sub-operation room for localized control.

FIGS. 2A-2C show views of a refilling arm 80 employed in the refilling station 10D. As shown in the figures, the refilling arm 80 is made up of a carrier 81, a rotary joint 88, a pedestal 82 and three articulated arms 83, 84, 85 which are joined to an adjacent member arm by pivots 99a, 99b, 99c. The extremity arm 85 is hollow and has a hollow telescopic segment 86 that is extendable, retractable and rotatable. Preferably, the free end of the telescopic segment 86 is equipped with a connector 89 for fitting with a fluid discharge nozzle 90, which discharge nozzle 90 fits into an inlet port on the IMO tank 22. The other end of articulated arm 85 at the pivot 99c is closed by a segment 87, for eg., by being welded, so that the inside hollow cavity of both the articulated arm 85 and telescopic segment 86 are leak-proof; preferably, the closed segment 87 has a hose fitting (not shown) that allows fluid flow or granular flow into the articulated arm 85 and flow out from the discharge nozzle 90.

In one embodiment, the carrier 81 is mounted to translate on tracks laid on the ground of the refilling station 10D, for example between two rows of stacked-up IMO tanks 22. Upon receiving a refill order, the refilling arm 80 translates to a point near to the designated IMO tank 22 and by rotating at the rotary joint 88, moving the articulated arms 83, 84, 85 or the telescopic segment 86, the discharge nozzle 90 can be inserted into the inlet port of the designated IMO tank. FIGS. 2A-2C are highly simplified and a hose for fluid cargo flow through the refilling arm 80 are not shown; also not shown are flow sensors disposed at the discharge nozzle 90, position sensors disposed at the discharge nozzle 90 and pivots 99a,99b,99c to sense and to position the refilling arm 80, the articulated arms 83,84,85, the telescopic segment 85 and discharge nozzle 90. Position sensors are also mounted at the rotary joint 88 to determine angular positions of the pedestal 82, articulated arms and discharge nozzle 90. In another embodiment, it is possible that the carrier 81 is mounted at a fixed central location in the re-filling area 10D but the discharge nozzle 90 is arranged to reach the inlet ports of the IMO tanks 22 located therein. In another embodiment, it is possible that the carrier 81 is suspended at a height above the IMO tanks, and the articulated arms 83,84,85 and telescopic segment 86 and the discharge nozzle 90 extend down to reach the IMO tanks 22. In yet another embodiment, a separate transfer hose (with a discharge nozzle 90a) is attached to an outside of the telescopic segment 86 and at least to part of the extreme articulated arm 85, so that the refilling arm 80 is articulated to move and to position the discharge nozzle 90a to an inlet port of the IMO tank for refilling. Depending on the size of the refilling area 10D, more than one refilling arms 80 may be employed.

Usually for a freight container, dry cargo (such as granular material) is charged into the freight container 22 through an inlet hopper located near a top of the freight container from a discharge chute 90b (not shown in the figures). The discharge chute 90b may be the terminal end of an articulated transfer chute (instead of a hose or transfer hose). As in the above embodiment, the discharge chute 90b and part of the transfer chute are supported on the outside of telescopic segment 86 and, at least, to part of the extreme articulated arm 85, so that the refilling arm 80 is articulated to move and to position the discharge chute 90b to the inlet hopper.

FIGS. 2A-2C show a pedestal 82 supporting one refilling arm 80. It is also possible that a pedestal 82 supports two or more refilling arms 80; with position sensors and encoders located on respective articulated arms, telescopic segment, discharge nozzle/discharge chute, the operating envelop of each of the refilling arms 80 is determinate and mechanical interference is preventable; such operating envelops are determined dynamically by a controller located at the refilling station 10D with inputs from the various position sensors and encoders (ie. instead of being fixed statically); with separate flow sensors located at the discharge nozzles or discharge chutes, two or more numbers of the refilling arms 80 can be deployed simultaneously for refilling separate IMO tanks or freight containers 22 for quicker operation or shorter turn-around time.

Now, operation of the above bulk fluid cargo distribution terminal 10 is described. The silos 21,21a-211 are big storage tanks and are equipped with the necessary safety devices, pipes and controls for inlet charging (for eg., from a large supply vehicle or ship) and outlet discharging to the refilling station 10D. Before a prime-mover 61 with a trailer 62 or an empty IMO tank/freight container 22 mounted on a trailer 62 is allowed into the entry point 14a, preliminary security checks are conducted, at least, for vehicle entry permit, type of IMO tank/freight container 22 and content, for eg. by scanning a barcode or QR code attached on the IMO tank/freight container. Further safety checks for any explosive threats are also conducted on the IMO tanks/freight containers 22, trailers 62 and prime movers 61. Once allowed to enter the entry area 14a, identity of the prime-movers 61, driver and IMO tanks/freight containers 22 are recorded. The empty IMO tanks/freight containers 22 are then transferred by the gantry crane 41a into the inspecting station 10C, where the IMO tanks/freight containers are checked and inspected for mechanical integrity, such as, damaged marks, corrosion, etc. and that safety valves and gauges are not tampered with, so that the IMO tanks/freight containers 22 are safe to proceed with refilling. Further, traces of contents in the IMO tanks/freight containers are verified and the carrying capacities are determined and recorded, for eg. in a computer located in the terminal control room. After passing the inspection checks, the IMO tanks/freight containers 22 are transferred to the refilling station 10D where the IMO tanks/freight containers 22 are filled with the permitted contents according to associated purchase orders. Some of the IMO tanks/freight containers can be stacked up before or after refilling. Manual or automatic refilling can also be carried out. After being refilled, the inlet and outlet ports of each IMO tank 22 or hopper of each freight container 22 are sealed before being transferred to the delivering station 10E. In the delivering station, some of the IMO tanks/freight container 22 are stacked up to wait for designated trailers 62 and prime-movers 61 to deliver the IMO tanks/freight container 22 to their destinations. When the designated trailer 62 and prime-mover 61 are ready outside the delivering station 10E, the gantry crane 41c is operated to transfer the filled IMO tanks/freight containers 22 onto the designated trailer 62, and after goods and vehicle clearance, the prime-movers 61 and trailers 62 exit the distribution terminal 10 for delivery.

Whilst not described, it is possible that other facility, such as a weighing bridge, is installed before or after the entry point 14a. From scaling devices in the weighing bridge, the weight of the IMO tank can be quickly verified from the name plate and vehicle weight as part of the preliminary security check.

FIG. 3A shows a plan view of three nested and retractable covers 30 for installation above each of the inspecting 10C, refilling 10D and delivering 10E stations, whilst FIG. 3C shows a side view. The nested covers 30 are supported by two beams 13a,13b, with each beam 13a, 13b being fixed along a long, top edge of each associated fortified wall 11c, 11e. FIG. 3D shows part of section view AA in FIG. 3C. FIGS. 3A,3C-3D show each set of nested and retractable cover 30 is made up of 3 nesting covers 33a, 33b, 33c so that one component cover fits under another when the covers are retracted; the retractable cover 30 is more clearly shown at the right hand end of FIG. 3C. Each extreme end of the nested cover 30 is defined by a stopper 16, 16a-16d. As there are three adjacent sets of nested covers 30, two adjacent nested covers 30 share a common intermediate stopper 16b, 16c. Preferably, each of the stoppers 16, 16a-16d is provided with a sealing material 92. All the nested covers are moveable on rollers 37; preferably, some of the rollers on the inner most cover 33c are motorized, so that by operating the motorized rollers, the outer nesting covers 33a, 33b can be made to extend or retract together with movement of the inner most cover 33c. Preferably, the outermost cover 33a is restrained to travel along its tracks by some preventers 36; by so doing, the outermost cover 33a is prevented from being blown off or falling off. The preventer 36 is illustrated in FIG. 3B.

In another embodiment, it is possible that some of the rollers 37 of the outer most cover 33a and middle covers 33b are also motorized. Preferably, these covers 33a, 33b are also restrained to travel along their tracks by similar preventers 36 (but not shown in FIG. 3B). Preferably, on both sides of the rollers 37, two sealing strips 93 are disposed near a base of the associated component covers 33a,33b,33c.

FIGS. 4A-4E show two foldable and retractable covers 30a, 30b according to another embodiment. For illustration only, the first cover 30a serves the inspecting station 10C, whilst the second cover 30b serves both the refilling and delivering stations 10D, 10E. As in the previous embodiment, these foldable covers 30 are supported on two beams 13a, 13b, which are fitted along a long, top edge of each associated fortified walls 11c, 11e. Each cover 30a, 30b is made up of pivoted component panels, such as 33d-33g or 33h-33n, which fold up in a vertical manner and are connected at upper pivots 34 and lower pivots 35. In the folded-up manner, the lower pivots 35 are provided with rollers which run on tracks disposed on the two beams 13a, 13b. Some of the lower pivots 35 are motorized to allow automated or remote-controlled folding or retracting of the foldable covers 30a, 30b. Preventers 39, for eg., solenoid operated plungers 38, are provided (as shown in FIGS. 4B-4C) below some of the component panels 33d-33n, so that the plungers 38 in the extended positions help to lock the component panels 33d-33n from being blown off or falling off from their tracks.

While specific embodiments have been described and illustrated, it is understood that many changes, modifications, variations and combinations thereof could be made to the present invention without departing from the scope of the invention. For example, the position sensors may be proximity distance sensors, linear encoders, rotary encoders and so on that help to determine positions and orientations of the discharge nozzle 90, 90a, discharge chute 90b, the articulated arms, the rotary joint 88 and, if necessary, the carrier 81.

The invention claimed is:

1. A bulk fluid cargo distribution terminal comprising:
    a silo area for storing wet cargo, liquid chemical and fluid chemical or dry cargo, which wet, liquid chemical and fluid chemical, on dry cargo is fluid or flowable and suitable for distribution in IMO tanks and/or freight containers;
    a compartmentalized area separated along a side of the silo area, with the compartmentalized area being designated as an inspecting station, a refilling station and a delivering/stacking station; and a driveway located adjacent to the compartmentalized area, with the driveway having an entry point and an exit point for prime-movers and trailers carrying IMO tanks or freight containers;

wherein the silo area and the compartmentalized area are protected by walls that are fortified against a vehicle crash or blast forces.

2. The terminal according to claim 1, further comprising a crane arranged to traverse above a top of the fortified walls to serve the inspecting, refilling and delivering/stacking stations, with the crane extending over the driveway.

3. The terminal according to claim 1, further comprising a guard or security control room located near each of the entry and exit points.

4. The terminal according to claim 1, wherein the refilling station further comprising an articulated refilling arm with a pedestal, which pedestal has a rotary joint.

5. The terminal according to claim 4, wherein the pedestal and rotary joint are supported on or suspended from a carrier.

6. The terminal according to claim 5, wherein the carrier is operable to translate or moveable on a track.

7. The terminal according to claim 6, wherein the track is supported on a ground.

8. The terminal according to claim 7, wherein the carrier is suspended above a tallest IMO tank or freight container.

9. The terminal according to claim 5, wherein the carrier is fixedly mounted to a ground.

10. The terminal according to claim 4, wherein the articulated refilling arm terminates with a refilling nozzle and accompanying position and flow sensors.

11. The terminal according to claim 10, wherein the refilling nozzle is mounted on a connector connected to a telescopic segment, which telescopic segment is associated with an extremity member of the articulated refilling arm and the telescopic segment is extendable, retractable and rotatable, which positions and orientations are determined by position sensors or encoders.

12. The terminal according to claim 11, wherein the articulated refilling arms are pivoted and associated position sensors determine positioning/orientation of the articulated refilling arms.

13. The terminal according to claim 12, wherein the articulated refilling arms further comprise a discharge hose that goes through an inside hollow cavity of the articulated refilling arms.

14. The terminal according to claim 11, wherein a transfer hose with an associated discharge nozzle is attached to an outside of the telescopic segment.

15. The terminal according to claim 11, wherein a transfer chute with an associated discharge chute is attached to an outside of the telescopic segment to direct the dry cargo into an inlet hopper of a designated freight container.

16. The terminal according to claim 4, wherein the pedestal supports two or more refilling arms, and envelops of operation of the refilling arms are determinate and do not interfere with one another, so that the two or more refilling arms can be deployed simultaneously.

\* \* \* \* \*